UNITED STATES PATENT OFFICE.

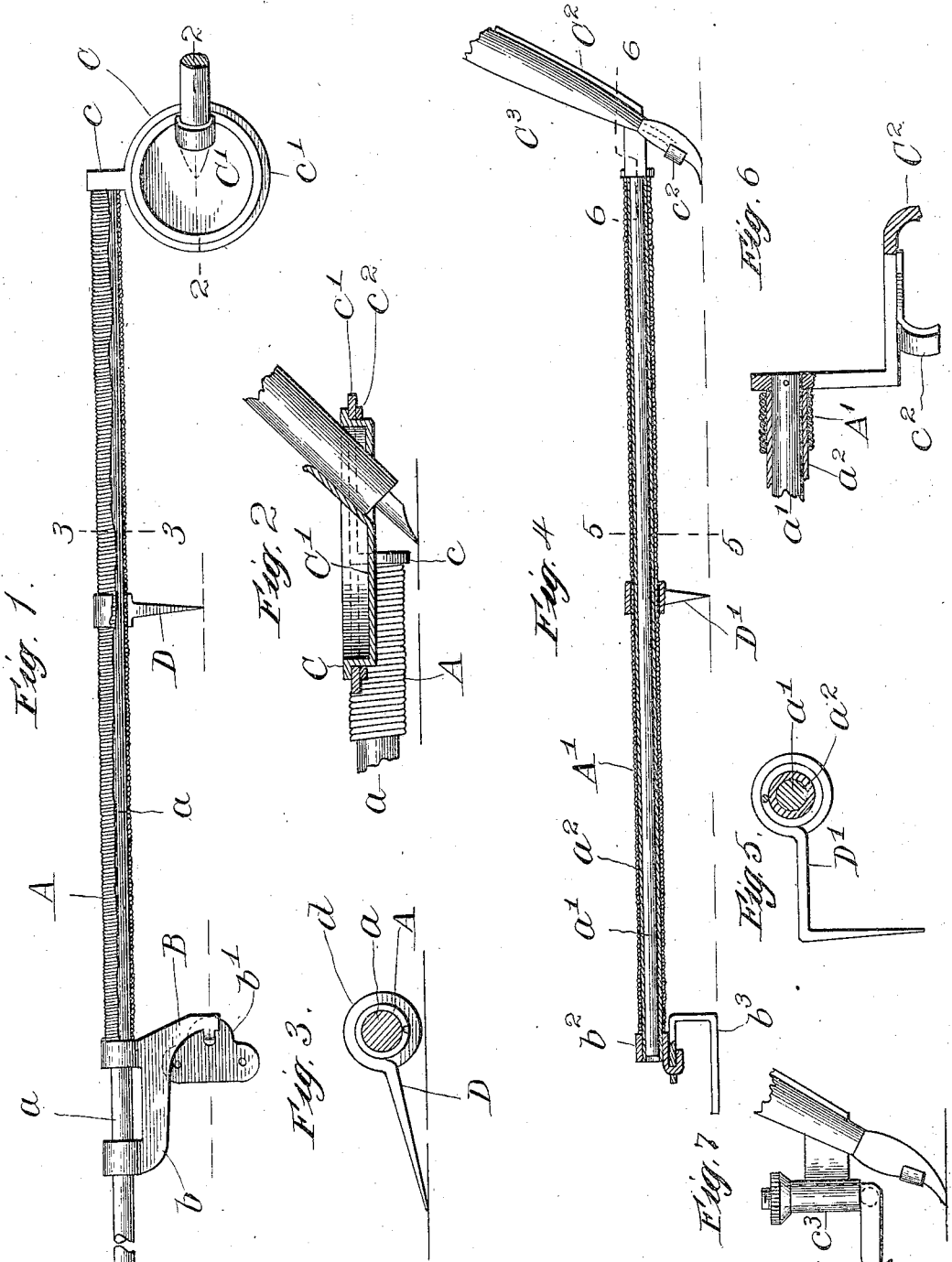

ALFRED SHAKER, OF CHICAGO, ILLINOIS.

DRAWING INSTRUMENT.

No. 836,221.      Specification of Letters Patent.      Patented Nov. 20, 1906.

Application filed January 31, 1906. Serial No. 298,793.

*To all whom it may concern:*

Be it known that I, ALFRED SHAKER, a citizen of the United States of America, residing at Chicago, in the county of Cook and State of Illinois, have invented certain new and useful Improvements in Drawing Instruments, of which the following is a specification.

My invention relates to certain new and useful improvements in drawing instruments; and its object is to produce a cheap and simple device for making copies of pictures, paintings, drawings, and the like. To such end the invention consists in certain novel features of construction, a description of which will be found in the following specification and the essential features pointed out in the claims.

The invention is illustrated by means of the drawings furnished herewith, in which—

Figure 1 is a plan view of my improved drawing instrument, a portion of the elastic medium being broken away to illustrate the core, such core being also partly broken away. Fig. 2 is a vertical longitudinal section taken in the line 2 2 of Fig. 1. Fig. 3 is a cross-section in the line 3 3 of Fig. 1. Fig. 4 is a view, partly in side elevation and partly in longitudinal section, of a somewhat modified form. Fig. 5 is a section in the line 5 5 of Fig. 4. Fig. 6 is a section in the line 6 6 of Fig. 4, and Fig. 7 is an end view of a second modified form of instrument-holder.

Referring first to Figs. 1, 2, and 3, A represents an elastic medium, here shown in the form of a coiled spring, one end of which is secured to a base B and the other to a holder C. Within this coiled spring is a core $a$ in the form of a rod, one end of which is secured to an ear $c$, formed upon the holder C, the other end of the rod passing through suitable ears formed upon the base B. The base B is made up of two portions, the portion $b'$ of which may be secured to the drawing-board in any suitable manner—as, for instance, by means of thumb tacks or screws passing through holes provided in this part. The other portion $b$ of the base B is pivoted to the stationary portion and is capable of oscillation about its pivotal connection with the same.

Upon the spring is mounted a pointer D, which is capable of longitudinal adjustment along the spring. It is formed with an eye $d$, which encircles the spring and fits quite closely upon the same in order that it may be secured at any point upon the spring by friction alone.

The holder is made up of two parts, one of which $c'$, is in the form of a ring, in which is rotatably mounted a disk $C'$. An opening is formed in this disk through which a suitable instrument, such as a pen or pencil, may be thrust. This disk may be kept in place by a washer $c^2$, secured to the disk in any suitable manner and bearing upon the under side of the ring $c'$. If desired, the penholder may be rigidly secured in this disk either by brazing or soldering it therein.

In use the point of the pen should be immediately below the center of the disk, which is in a line passing through the point of the pointer and the pivot of the base. When the pen is grasped in use, the point will thus remain in line regardless of any angular position of the pen with respect to the other parts of the device.

In the modified form illustrated in Fig. 4 the core is shown in the form of a rod $a'$, rigidly fastened to the holder and telescoping in a tube $a^2$, secured upon the member $b^2$ of the base. The spring A' surrounds these telescoping members, as in the preferred form, and the pointer D' surrounds the spring and operates as does the pointer in the preferred form. The holder is slightly modified, being in the form of a rest $C^2$, adapted to receive a brush $C^3$, and being formed with a clip $c^2$ for holding the tip of the brush in place. In this modified form the stationary portion $b^3$ of the base is of some vertical extent, so that the spring and core are raised up quite a distance from the drawing-board.

In Fig. 7 the brush-holder is modified in that it is formed with a swiveled connection $c^3$ in order that it may be turned about the central point of the holder, which is also in a line passing through the point of the pointer and the pivotal connection between the two parts of the base.

In using the device the pointer is slid along the spring to a position depending upon the amount of enlargement that is desired. If it is desired to make a slight enlargement of the picture, the pointer is moved nearer the holder, and if a great enlargement is desired it is moved farther away. The device is operated as is the ordinary pantograph now in use, the base being fixed to the drawing-board and the picture to be copied placed so that it may be traced by the pointer. The holder is then grasped in the hand and the pen or pencil moved about upon the cardboard or other material upon which it is desired to reproduce the picture, care being taken to have the point of the pointer follow the lines of the picture.

One of the desirable features of this device is the fact that the elastic medium is guided upon a suitable core, and the device is therefore much easier to handle in copying drawings than in a device where no guide for the elastic medium is provided. Moreover, the swiveled connection of the holder permits the pen or pencil to turn, so that greater ease in handling the instrument is thus facilitated.

I realize that other alterations and modifications besides the ones shown and described are possible, and I therefore do not intend to limit myself to the exact construction shown and described.

I claim as new and desire to secure by Letters Patent—

1. A drawing instrument comprising a base, an instrument-holder, a core secured to one of said parts, an elastic medium surrounding the core and connecting the base and instrument-holder, and a pointer mounted upon the elastic medium.

2. A drawing instrument comprising a base, an instrument-holder, an elastic medium connecting said base and instrument-holder, a core secured to the instrument-holder and extending through the elastic medium, and a pointer mounted upon the elastic medium.

3. A drawing instrument comprising a base, an instrument-holder, an elastic medium connecting the base and instrument-holder, a core secured to the instrument-holder and extending through the elastic medium and base, and a pointer slidably mounted upon the elastic medium.

4. A drawing instrument comprising a base, an elastic medium connected thereto, a core sliding within the elastic medium, a pointer upon the elastic medium, and an instrument-holder containing a part rigidly secured to the core and to the other end of the elastic medium, and a second part which is adapted to contain the instrument, swiveled in the first-named part.

5. A drawing instrument comprising a base, an instrument-holder, a coiled spring connecting said base and instrument-holder, a core secured to the instrument-holder and sliding within the spring, and a pointer mounted upon the spring.

6. A drawing instrument comprising a base, an instrument-holder, a coiled spring connecting the base and holder, a core secured to the holder and sliding in the coiled spring and base, and a pointer slidably mounted upon the spring.

In witness whereof I have signed the above application for Letters Patent at Chicago, in the county of Cook and State of Illinois, this 29th day of January, A. D. 1906.

ALFRED SHAKER.

Witnesses:
   CHAS. O. SHERVEY,
   J. E. SHERVEY.